United States Patent
Ruettiger

(10) Patent No.: US 8,081,156 B2
(45) Date of Patent: Dec. 20, 2011

(54) CONTROL ELEMENT WITH PROGRAMMABLE HAPTICS

(75) Inventor: Anton Ruettiger, Wildflecken (DE)

(73) Assignee: Preh GmbH (DE)

( * ) Notice: Subject to any disclaimer, the term of this patent is extended or adjusted under 35 U.S.C. 154(b) by 1035 days.

(21) Appl. No.: 11/436,532

(22) Filed: May 19, 2006

(65) Prior Publication Data

US 2006/0274033 A1    Dec. 7, 2006

Related U.S. Application Data

(63) Continuation of application No. PCT/EP2004/012013, filed on Oct. 23, 2004.

(30) Foreign Application Priority Data

Nov. 20, 2003 (DE) ................................ 103 54 393
May 8, 2004 (DE) ......................... 10 2004 022 846

(51) Int. Cl.
*G09G 5/00* (2006.01)
*G09G 5/08* (2006.01)
*H01H 9/00* (2006.01)

(52) U.S. Cl. ......... 345/156; 345/165; 345/166; 335/205

(58) Field of Classification Search ............... 345/156, 345/161, 164, 165; 335/200–207
See application file for complete search history.

(56) References Cited

U.S. PATENT DOCUMENTS

| | | | | |
|---|---|---|---|---|
| 4,318,065 A | * | 3/1982 | Harbauer | 335/17 |
| 4,318,095 A |   | 3/1982 | Fukuoka | |
| 7,683,748 B2 | * | 3/2010 | Ruettiger | 335/205 |
| 2001/0052893 A1 | * | 12/2001 | Jolly et al. | 345/156 |
| 2002/0021282 A1 | * | 2/2002 | Masudaya | 345/156 |
| 2002/0057152 A1 | * | 5/2002 | Elferich et al. | 335/220 |
| 2002/0080114 A1 | * | 6/2002 | Numata et al. | 345/156 |
| 2003/0184518 A1 | * | 10/2003 | Numata et al. | 345/156 |

FOREIGN PATENT DOCUMENTS

| | | |
|---|---|---|
| DE | 36 05 088 A1 | 11/1987 |
| DE | 41 21 571 A1 | 1/1993 |
| DE | 100 29 191 A1 | 12/2001 |
| EP | 1 217 496 A2 | 6/2002 |

OTHER PUBLICATIONS

Gary Weissenbacher, "Mensch—Maschine—Interface," Proseminar Softwar for automotove control devices, pp. 7-10.

* cited by examiner

*Primary Examiner* — Bipin Shalwala
*Assistant Examiner* — Benyam Ketema
(74) *Attorney, Agent, or Firm* — Cantor Colburn LLP

(57) ABSTRACT

The invention is directed to a control element, particularly for automotive electronics, having programmable haptics. Moments of force or a variation of the friction moments are formed on a control element by dynamically adapting the operative currents of electromagnetic arrays in dependence of the adjustment path. The force/path behavior (tactile feedback) of the control element can be modified at will during use so that the actuation forces for different operative functions can be varied. The tactile feedback of the moments of force on the control element takes by way of a locking piece, which, for example, can be comprised of at least one locking disc and a spring, which can be rendered active or inactive via an electromagnetic array.

17 Claims, 2 Drawing Sheets

CONTROL ELEMENT WITH PROGRAMMABLE HAPTICS

This nonprovisional application is a continuation of International Application PCT/EP2004/012013, was filed on Oct. 23, 2004, and which claims priority to German Patent Application Nos. DE 10354393.7 and DE 102004022846, which were filed on Nov. 20, 2003 and May 8, 2004, respectively, and which are all herein incorporated by reference.

BACKGROUND OF THE INVENTION

1. Field of the Invention

The present invention relates to a control element, particularly for automotive electronics, comprising programmable haptics.

2. Description of the Background Art

Known are control elements with various movement combinations. For example, pressure/rotary switches, joysticks (press, slide, and rotate) etc. are known. With conventional MMI control elements (man-machine-interface), the force/path behavior of the deflection movement is frequently mechanically fixed by spring elements. The haptic feedback to an operator is also transmitted via the spring elements (DE 41 21 571 C2).

From DE 36 05 088 C2, which corresponds to U.S. Pat. No. 4,859,922, a control device for a magnetic videotape device from a technically remote field is known. It is provided with coils to simulate click-stop positions independent of the rotational position of the rotary knob. In this manner, mechanical functions are to be electrically simulated.

From "Mensch-Maschine-Interface," Proseminar Software for automotive control devices, by Gary Weissenbacher, pages 7 to 10, it is known that, depending on the position of a cursor on a display unit, different haptics can be generated by an electric motor so that a driver can recognize the input situation without taking his or her eyes off the road and the traffic.

Also known are electronically controlled liquid rotary knobs used as haptic control elements (DE 100 29 191 A1, which corresponds to U.S. Publication No. 2002057152). A gap located between rotary knob and magnetic circuit is thereby filled with a magnetorheologic liquid. A coil is provided to produce a variable braking effect on the rotary knob.

SUMMARY OF THE INVENTION

It is an object of the present invention to provide a control element, which is easy to operate.

The invention is based on the idea to form the moments of force or the friction or application moments, on the control moments by dynamic adaptation of the operative currents of electromagnetic arrays in dependence from the adjustment path, that is, the conventional mechanically fixed force-path behavior of the deflection movement is replaced by any desired electrically programmable behavior, whereby a mechanical feedback by a mechanical click-stop or the like is not forgone. During operation, the force-path behavior (tactile feedback) of the control element can be altered at will so that the actuation forces for various operative functions can be varied.

In an embodiment of the present invention, default behaviors can be freely selected by an operator, and depending on the underlying functions, can be adjusted individually.

It is also possible that the tactile feedback is only retrieved upon execution of a command, for example.

The tactile feedback of the moments of force on the control element can occur by way of a locking piece that can be comprised of at least one locking disc and a spring, which can be rendered active or inactive by an electromagnetic array. Variable spring forces (pressure force on the locking disc) for the electromagnetic array can be selected by, for example, a PWM (pulse width modulated) signal. In a further embodiment, a smooth disc having a fixed friction value and a friction lever is used for a locking piece; its pressure force on the disc can be varied via the magnetic array. By way of the modulated magnetic force, a friction moment is simulated during rotation.

A feature of the invention is not to unconditionally replace all the mechanical haptics with electrical ones, but to complement some of the mechanical haptics with electrical forms, to vary, and thus adapt to a new user philosophy.

By using light barriers as additional rotational angle sensors, a signal for the activation of the electromagnetic arrangement can be generated in dependence from the rotational angle speed so that depending on the rotational angle speed, the force/path behavior can be altered.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
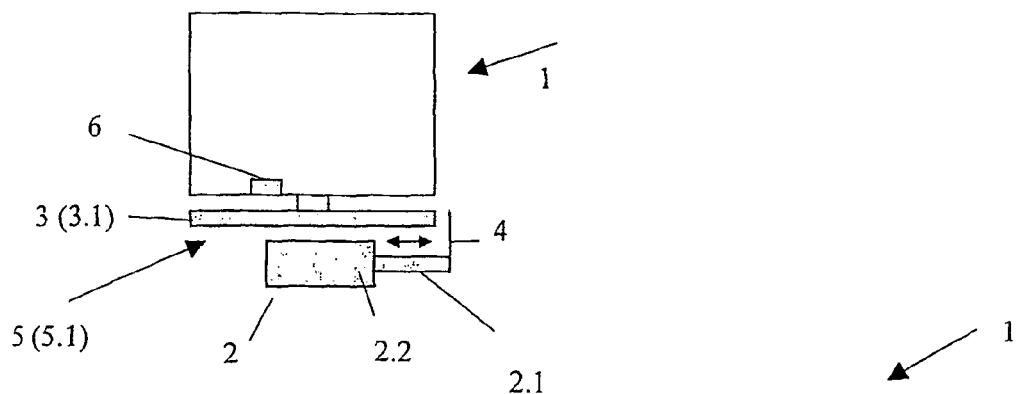
FIG. 1 illustrates an embodiment of the invention.

FIG. 1 shows a control element 1 having a locking piece 5 that is mounted, for example, on a peripheral side. In this embodiment, this locking piece is a locking disc 3, which acts on a spring 4. By way of an electromagnetic array 2, in the instant embodiment a core 2.1, which interacts functionally with a coil 2.2, the spring 4 is pressed to, or pressed by the locking disc 3, depending on the magnetic force of the coil 2.2 and the pull of the core 2.1, that is, the electromagnetic array 2 renders the locking disc 3, and thus a haptic, active or inactive.

In a further embodiment, the spring force of the electromagnetic array 2 can be varied in a known manner by a PWM signal, which then actuates the coil 2.2. Thus, a variation of the pressure force of the spring 4 on the locking piece 3 occurs due to different magnetic fields.

In the embodiment according to FIG. 1, the electromagnetic array 2 is arranged below the control element 1. It goes without saying that this arrangement can be variable. What is essential is that the electromagnetic array 2 can adjust the spring 4 against the locking disc 3.

Another solution is shown in a different locking piece 5.1, when, instead of the locking disc 3 on the peripheral side or below the control element 1, a smooth disc 3.1 having a fixed friction value is used, and instead of springs 4, a friction lever (not shown in detail) is used for a locking piece 5. The friction lever can thereby impact the disc 3.1 laterally, as well as from below or above, similar to the illustration in FIG. 2. By way of the electromagnetic arrangement 2, a friction moment is simulated during rotation, which is utilized as tactile feedback.

Figure 2:
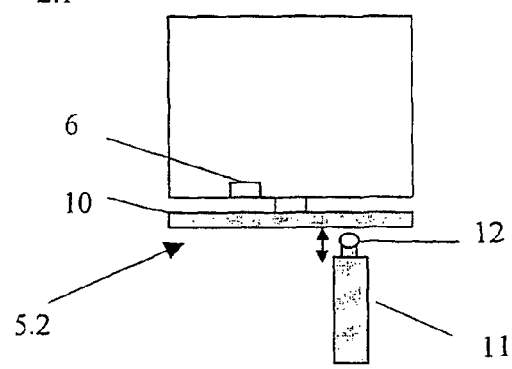
FIG. 2 illustrates a variation of FIG. 1.

In FIG. 2, a disc 10 with a fixed electromagnetic array 11 similar to the arrangement in FIG. 1 functions as a locking piece 5.2. Similar to the spring in FIG. 1, or the friction lever, a rubber-like device 12 hereby impacts the disc 10, in the instant embodiment preferably from below, and generates a braking torque that impacts the control element 1, thus transmitting tactilely to the operator.

A light barrier 6 or the like (for example, a code disc), either already present in the control element 1 or else added, serves as a rotational angle sensor so that in addition, depending on the rotational angle speed, a signal for the electromagnetic array 2 can be generated, which then can influence the friction moment or the braking torque, and thus the tactile haptics.

In a variation of the basic idea of the present invention, the integration of two locking disks and at least two springs is possible. The locking discs can then be located in different planes on the control element. Preferably, the springs should then be of different lengths so that one of the springs can always interact with one of the two locking pieces. Depending on the polarity of the at this point still singular electromagnetic array, one of the two springs (right-left) can then be actuated and pressed against the respective locking disc. However, a plurality of electromagnetic array, locking discs, and corresponding springs can also be used. The only limitation is the structural configuration of an actual control element 20.

Figure 3:
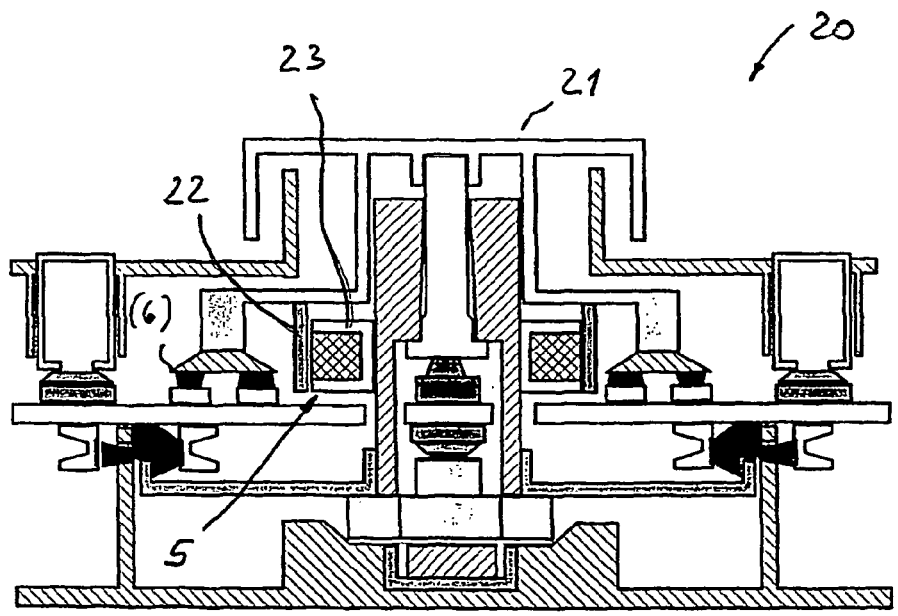
FIG. 3 illustrates the integration of the concept of FIG. 1 in a control element.

In FIG. 3, a possible application of the principle idea in a control element 20 is illustrated. To name the essential components, a locking piece 22 is integrated in a peripheral side of a button 21 of the control element 20. This interacts with a magnet 23 as previously described for locking piece 5. A spring is not necessary here if the locking piece 22 has the characteristics of a spring.

Figure 4:
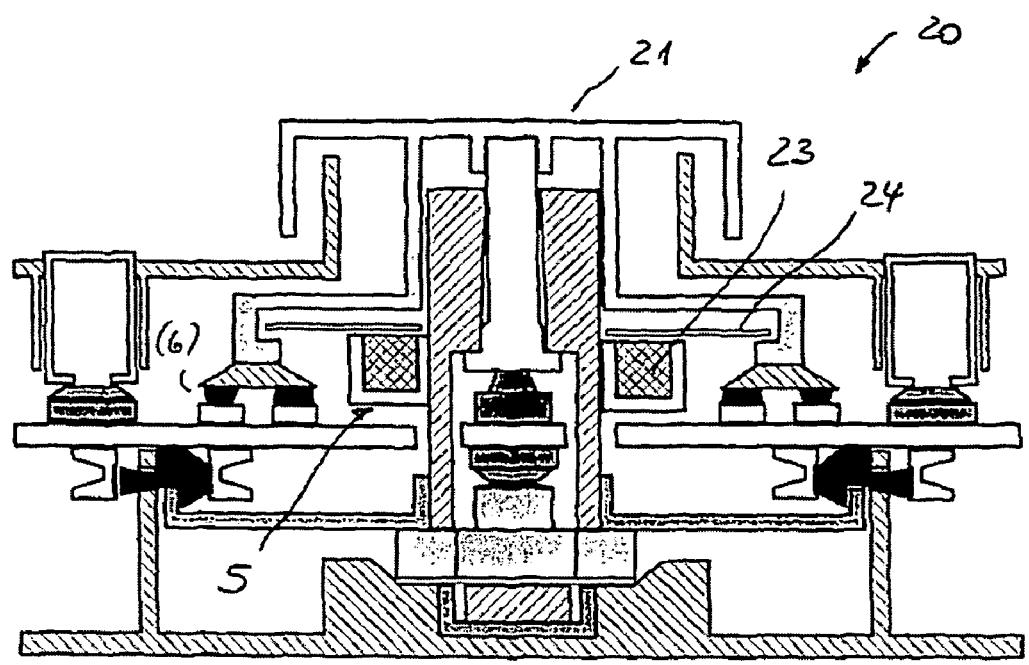
FIG. 4 illustrates an integration of the concept of FIG. 2 in the control element.

The integration of a disc 24 in the control element 20 as locking piece 5 is illustrated in FIG. 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A control element comprising:
   a mechanical locking piece for adjusting a force/path behavior on the control element, the locking piece including:
   a disc having a fixed friction value, and
   a braking device on which a friction lever is connected, the friction lever being configured to impact the disc with variable forces; and
   at least one electromagnetic array being functionally coupled with the braking device to apply variable magnetic forces in a first direction to the friction lever,
   the variable magnetic forces urging the friction lever to impact the disc with the variable forces, which are substantially similar to the variable magnetic forces, in a second direction, which is parallel with the first direction, such that the force/path behavior is varied.

2. The control element according to claim 1, wherein the locking piece includes at least one locking disc and at least one spring.

3. The control element according to claim 1, wherein the force/path behavior is formed by dynamically adapting operating currents of the electromagnetic array in dependence of the adjustment path.

4. The control element according to claim 3, wherein the adjustment path is determined by a rotational angle speed.

5. The control element according to claim 4, wherein the rotational angle speed is determined by a light barrier.

6. A control element, comprising:
   a single disc having a fixed friction value;
   a friction lever disposed at a periphery of the single disc; and
   an electromagnetic array coupled to and configured to apply variable magnetic force to the friction lever such that the friction lever is forced to impact an outer surface of the single disc with a variable level of force, which is substantially similar to the variable magnetic force, in a direction parallel to a direction along which the electromagnetic array applies the variable magnetic force to the friction lever.

7. A control element, comprising:
   a member having a fixed frictional value;
   a leverage providing part disposed proximate to the member; and
   an electromagnetic array coupled to and configured to apply variable magnetic force to at least one of the member and the leverage providing part such that the leverage providing part is forced to impact the member with a variable level of force, which is substantially similar to the variable magnetic force, in a direction parallel to a direction along which the electromagnetic array applies the variable magnetic force to the at least one of the member and the leverage providing part.

8. The control element according to claim 7, wherein the member comprises a disc.

9. The control element according to claim 7, wherein the leverage providing part comprises an elongated lever extending in a first direction from the electromagnetic array and a second direction proximate to the member.

10. The control element according to claim 7, wherein the leverage providing part comprises a spring.

11. The control element according to claim 7, wherein the electromagnetic array acts upon the at least one of the member and the leverage providing part in accordance with a PWM signal.

12. The control element according to claim 7, wherein the member comprises a disc and the leverage providing part comprises a device to impact the disc to generate a braking torque.

13. The control element according to claim 1, wherein the disc comprises a substantially solid and uniform outer surface having the fixed friction value, which is impacted by the friction lever.

14. The control element according to claim 13, wherein respective portions of the disc outer surface and the friction lever, where impact occurs, are substantially flat and parallel with one another.

15. The control element according to claim 13, wherein a portion of the disc outer surface, where impact occurs, is substantially flat and a portion of the friction lever, where impact occurs, is substantially curved.

16. The control element according to claim 1, wherein the friction lever is disposed at a periphery of the disc and the first and second directions are both parallel with a plane of opposing substantially flat and planar faces of the disc.

17. The control element according to claim 1, wherein the friction lever is disposed adjacent to one of opposing substantially flat and planar faces of the disc and the first and second directions are both normal with respect to a plane of the opposing substantially flat and planar faces of the disc.

* * * * *